Figure 5:
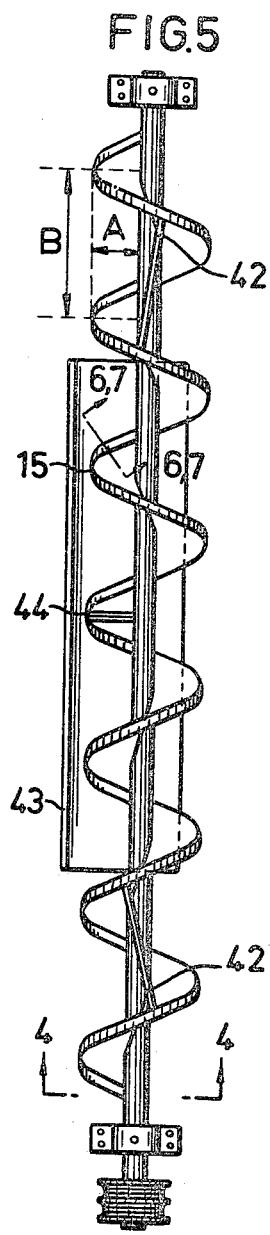

May 28, 1968    E. A. BRONEMO ETAL    3,385,331
BRANCH REMOVING MACHINE
Filed Jan. 10, 1966    6 Sheets-Sheet 1
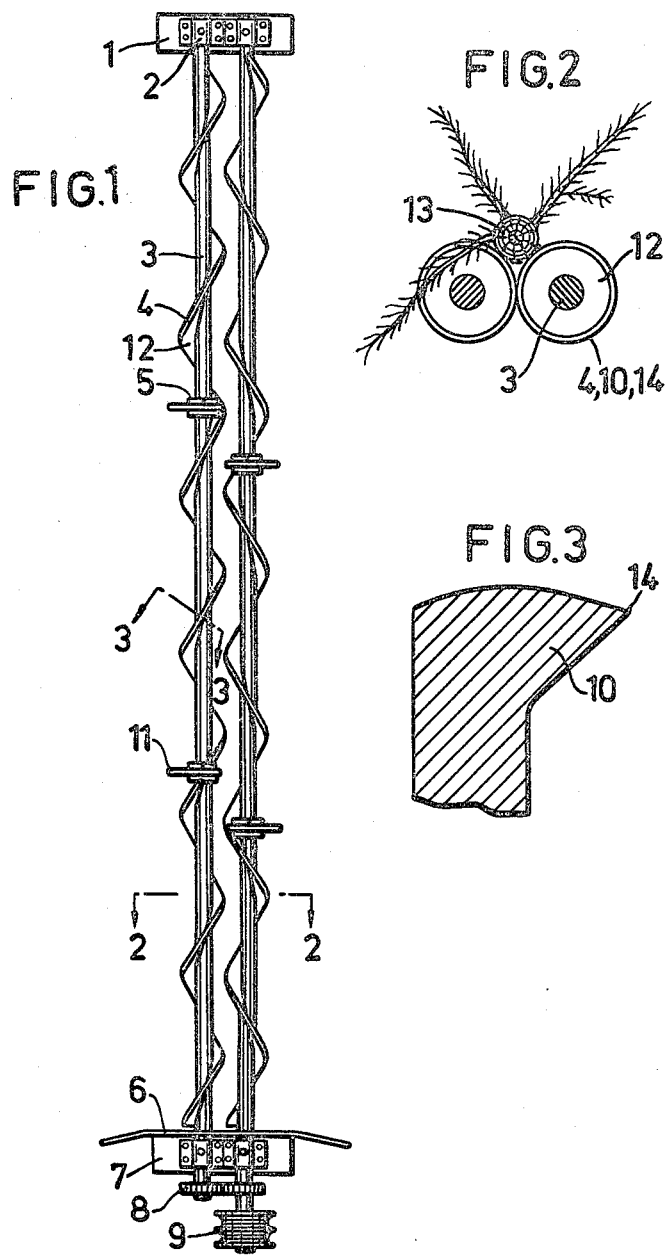

May 28, 1968  E. A. BRONEMO ETAL  3,385,331
BRANCH REMOVING MACHINE
Filed Jan. 10, 1966  6 Sheets-Sheet 2

Inventors:
Erik Allan Bronemo and
Gustav Roland Bronemo,
by Price, Rechtien & Parker
their Attorneys May 28, 1968  E. A. BRONEMO ET AL  3,385,331
BRANCH REMOVING MACHINE Filed Jan. 10, 1966  6 Sheets-Sheet 5

May 28, 1968     E. A. BRONEMO ET AL     3,385,331
BRANCH REMOVING MACHINE
Filed Jan. 10, 1966     6 Sheets-Sheet 6

United States Patent Office 3,385,331
Patented May 28, 1968

3,385,331
BRANCH REMOVING MACHINE
Erik Allan Bronemo, Vindeln, and Gustav Roland Bronemo, Bredbyn, Sweden, assignors to Sunds Verkstader Aktiebolag, Sundsbruk, Sweden
Filed Jan. 10, 1966, Ser. No. 519,505
Claims priority, application Sweden, Jan. 11, 1965, 299/65
14 Claims. (Cl. 144—2)

The present invention relates to branch removing machines and the main object of the invention is to provide a branch removing machine for stationary use as well as for use on a vehicle in connection with the tree harvesting operations in a forest.

A branch removing machine according to the invention is characterized by a frame and a branch removing, or delimbing, member rotatably mounted on said frame and provided with branch removing portions in the shape of edges, preferably sharp edges, saw-toothed portions or the like, said branch removing portions being arranged so as to extend obliquely with respect to a plane containing the geometrical axis of the branch removing member and obliquely with respect to a plane at right angles to the geometrical axis of the branch removing member. When viewed in a sectional plane containing the geometrical axis of the branch removing member said branch removing portions in the form of edges, toothed portions and the like are directed substantially parallel to the axis of the branch removing member, an interspace being provided between two adjacent branch removing edge portions in which the branches of the tree can enter to a considerable depth before being cut away by said edge portions. According to the invention the depth of said interspace, when measured radially with respect to the branch removing member, should be at least 50 mm., suitably at least 75 mm., and preferably at least 150 mm., in order that the functioning of the apparatus and the branch removing capacity thereof shall be satisfactory. Said branch removing portions are suitably in the shape of continuous, screw-shaped or helical edges, tooth-lines et cetera. The branch removing member is suitably arranged substantially in parallel relationship with respect to the tree trunk to be delimbed, it being possible, however, under certain circumstances to arrange the branch removing member at a predetermined angle with respect to the direction of length of the tree trunk.

The invention will hereinafter be described in detail, reference being made to the accompanying drawings, in which different embodiments of the invention are diagrammatically shown.

Figure 4:
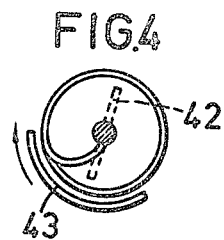
Figure 6:
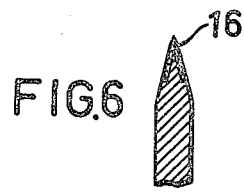
Figure 7:
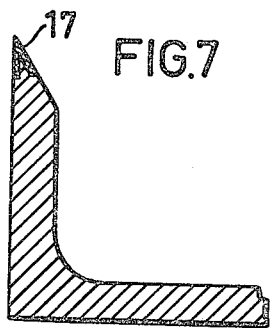
Figure 8:
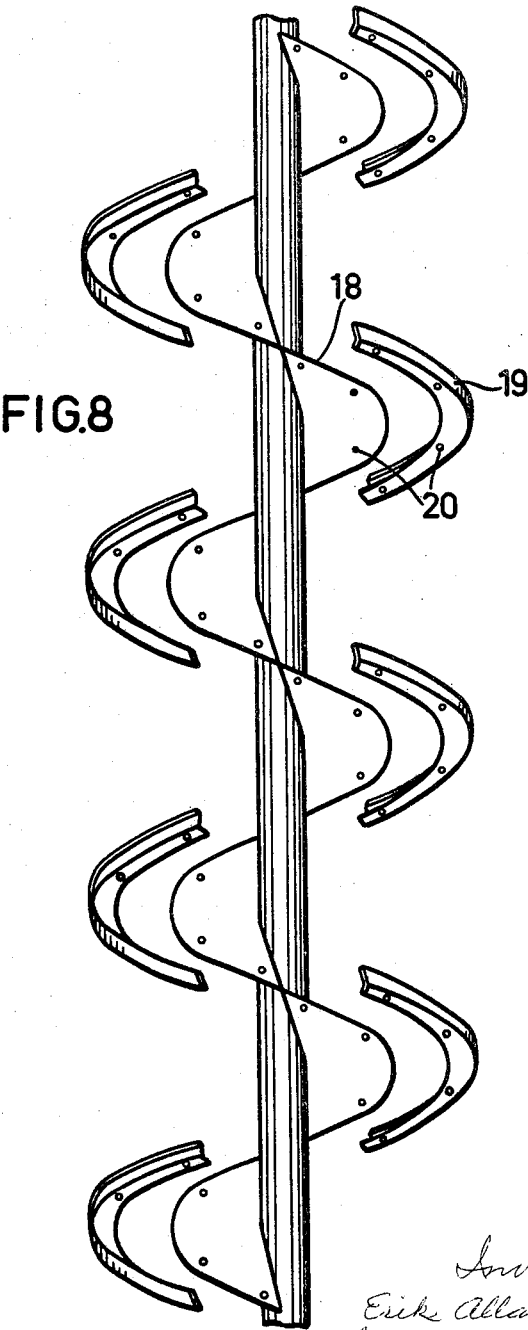
Figure 9:
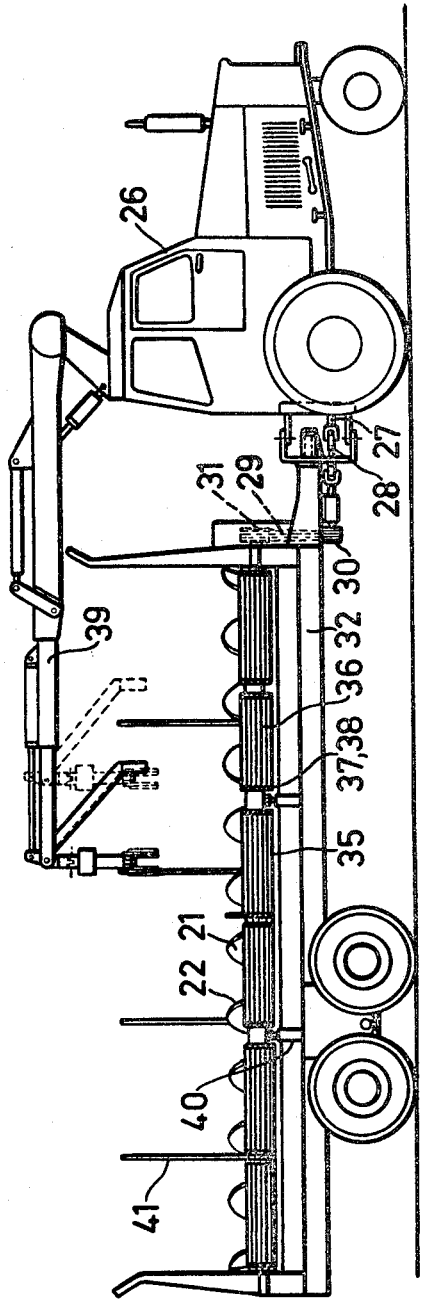
Figure 10:
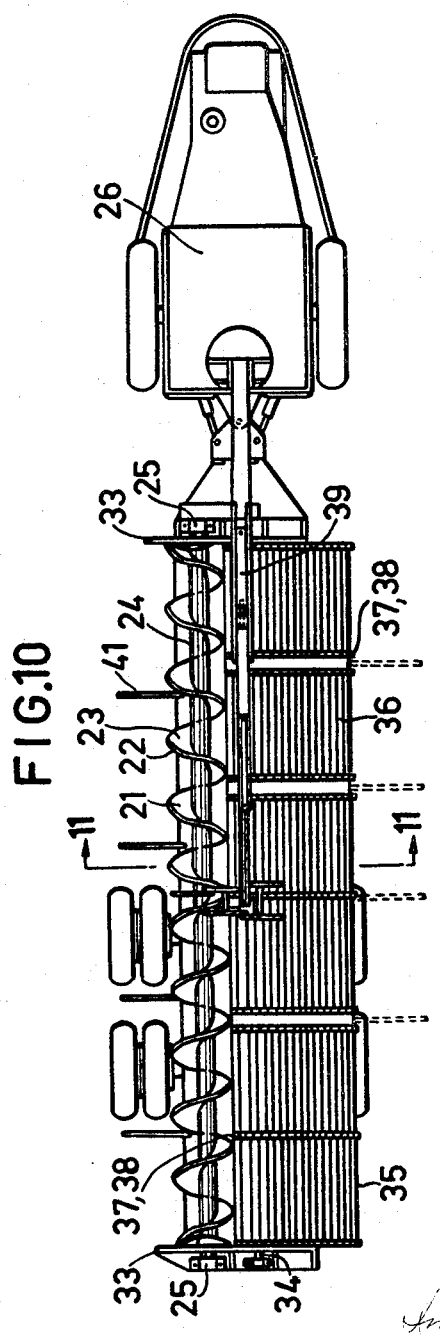
Figure 11:
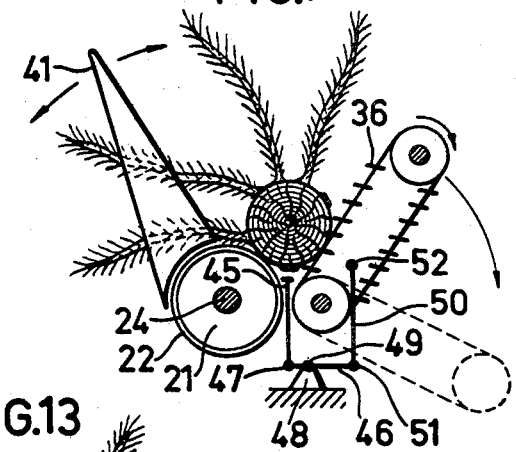
Figure 13:
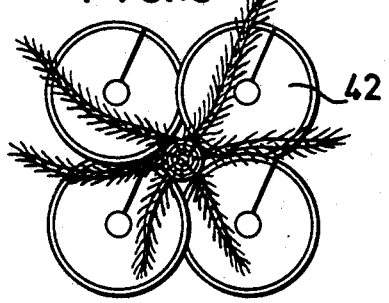
Figure 12:
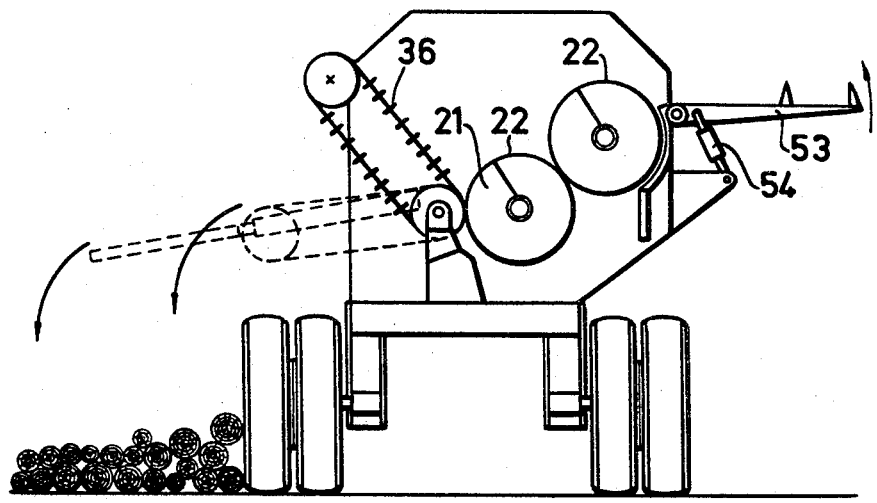

FIG. 1 is a plan view illustrating one embodiment of a branch removing machine according to the invention, comprising two branch removing members arranged in parallel. FIG. 2 is a cross sectional view of the embodiment shown in FIG. 1. FIG. 3, on an enlarged scale, shows the branch removing portion of the branch removing members shown in FIGS. 1 and 2, when seen in a sectional plane containing the geometrical axis of the branch removing member. FIG. 4 and FIG. 5 are, respectively, a cross sectional view and a plan view of another embodiment of the branch removing machine and comprising means for removal of the cut-away branches. FIGS. 6 and 7 are cross sectional views, in a plane containing the axis of the branch removing member, of two embodiments of branch removing edge portions differing from that shown in FIG. 3. FIG. 8 is a plan view of a modified embodiment of a branch removing member, comprising exchangeable edge portions which are shown in a position separated from the main body of the branch removing member. FIGS. 9 and 10 are, respectively, a side view and a plan view of a vehicle-carried branch removing machine according to the invention. FIG. 11 is a cross sectional view of the branch removing member with auxiliary means which form part of the mobile branch removing machine shown in FIGS. 9 and 10. FIG. 12 is a cross sectional view of a mobile branch removing machine according to the invention, said machine comprising auxiliary means for feeding tree trunks to the machine and for removing tree trunks from the machine, respectively. FIG. 13 is a cross sectional view of an arrangement of four branch removing members according to the invention.

In the embodiment according to FIG. 1 two branch removing members are arranged in parallel with respect to, and at a distance from, each other. Each branch removing member comprises a screw-shaped, or helically extending, preferably continuous portion 4 provided with a sharp edge, said portion 4 being formed in one piece with, or attached to, a likewise helically extending connection member 12 carried by a shaft 3, which is journalled in bearings 2 and 5. The branch removing members are rotated in opposite directions of rotation by means of a gearing 8, a pulley 9 and a motor (not shown). The tree trunk 13 to be delimbed is placed in the recess between the two branch removing members as shown in FIG. 2. Since the branch removing portions 4 comprise a sharp edge 14, or the like, provided on an axially extending portion 10 and thus directed substantially in the longitudinal direction of the branch removing member, when viewed in a sectional plane containing the geometrical axis of the branch removing member, the branches will be cut off from the tree trunk upon rotation of the branch removing members. During the branch removing operation the tree trunks will abut against the wall 6 and are thus prevented from moving axially. During the branch removing operation the tree trunks will also be rotated in order that all branches shall be cut off from the trunk which, if desired, may rest upon trunk carrying members 11.

In FIGS. 4–7 an embodiment is shown, which comprises a screw-shaped branch removing member, from the axis 44 of which the screw-shaped branch removing edge portions 15 are threaded in opposite directions. During the delimbing operation the two halves of the branch removing portions 15 will thus exert axial forces in opposite directions on the tree trunk so that the axial pressure of the latter against the wall 6 (FIG. 1) is substantially reduced.

In FIGS. 6 and 7 further embodiments of the branch removing, or working, edge are shown in cross sectional views. FIG. 6 exemplifies a working edge having two tapered surfaces, while FIG. 7 exemplifies an embodiment in which the working edge has one tapered surface. The sharp edge may be provided with a hard metal coating 16 and 17, respectively.

According to FIGS. 4 and 5 two plates, or wall members, 42 are provided at the ends of the screw-shaped branch removing member and arranged to throw away the branches which are cut off from the tree trunk. The cut-away branches are transported by the screw-shaped branch removing member to the opposite ends thereof, the cut-away branches resting upon and, during the transportation, being guided by a curved plate 43 mounted beneath and near the branch removing member and extending along the latter. If the branch removing member is threaded only one way the plates 42 are provided only at one end of said member or at one end and at the center thereof. It may be understood that plates 42 may be provided along the entire length of the branch removing member the branches then being thrown away immediately after having been cut off from the tree trunk.

FIG. 8 illustrates a branch removing member having a screw-shaped spacer 18, to the periphery of which branch removing portions 19, provided with axially extending sharp edges, are removably attached by means of screws, rivets or the like, fitted in holes 20 in the members 18 and 19. This embodiment is suitable for use under severe conditions.

The embodiments of the branch removing members described above and modifications thereof, such as, for instance, toothed and/or broken (discontinuous) branch removing edges, screw-shaped edges with varying pitch and/or several screw-shaped portions threaded in opposite directions along the axis of the branch removing member and/or branch removing members having more than one screw-shaped branch removing portion on its shaft, may be utilized in connection with various embodiments of the additional equipment of a functional branch removing machine.

One embodiment of a complete branch removing machine is shown in FIGS. 9, 10 and 11. The branch removing member 21 is provided with a working sharp edge 22. The screw-shaped connection or spacing member 23 is threaded in opposite directions from the center thereof and carries the sharp edge portion 22 at the periphery thereof. The connection member 23 is secured to a shaft 24 mounted in bearings 25 at its ends, it being understood that the branch removing member 21 may be divided into several sections, between which additional bearings may be provided. The branch removing member 21 is rotated and driven from the power take-off 27 of a tractor 26 via the universal joint 28 and the belt transmission 29, 30, 31. The branch removing member 21 is carried, via the bearings 25, by the frame 32 of a trailer-type vehicle. The frame 32 is provided with surfaces 33 against which the tree trunks may abut during the delimbing operation. The frame 32 also supports a platform 35 for the support and transportation of the tree trunks before and after the delimbing operation, for pressing the trunks against the branch removing member 21 and for rotating the trunk during the delimbing operation. The platform 35 consists of a number of endless conveyors, consisting of obliquely mounted, and transversely extending, profiles or ribs 36 for engagement, preferably frictional engagement, with the tree trunk, said conveyors being carried by endless chains 37 supported by chain wheels 38 and driven via the shaft 34, which may be driven in a similar manner as the shaft 24.

The operation of the branch removing machine is as follows. The tree trunk is lifted by the trunk lifting unit 39 of the tractor 26 and is released from a substantially horizontal position vertically above and along the nip between the rotating branch removing member 21 and the platform 35. While in said nip the trunk is being rotated and delimbed within 2–5 seconds after which the platform 35 is swung from its raised position, occupied during the delimbing operation and indicated by full lines in FIG. 11, to its lowered position, indicated by broken lines in FIG. 11, in which latter position the tree trunk leaves its delimbing position by rolling or sliding over the platform 35 or by the action of the conveyors, if the direction of conveyance of the latter is reversed with respect to the direction of conveyance during the feeding of the tree trunks to the branch removing member 21. The movements of the platform may be accomplished by means of hydraulic motors or the like. It is to be understood that the mode of operation, mentioned above, is stated only as an example. Thus, for instance, the delimbing of a trunk may be started while a previously delimbed trunk is being transported away from the branch removing machine. It may also be mentioned that several tree trunks may be delimbed simultaneously, especially if the trunks are of low-grade dimensions. The movements of the platform 35 may be controlled automatically by means of time relays or the like. When delimbing tree trunks of low-grade dimensions it may occur that the trunks remain in the nip between the branch removing member 21 and the platform 35 even after the latter has been swung to its lowered position, shown in broken lines in FIG. 11. For this reason a log ejector 45 is movably mounted so as to extend upwards into said nip and is guided by means which is not shown in the drawing. The log ejector is connected, at 47, to a two-armed lever 46 pivotally mounted, at 49, on a support 48 and connected, at 51, to a link 50 which is pivotally connected to the platform 35, at 52. When the platform 35 is swung downwards the log ejector 45 will be moved upwards, thus removing the delimbed log from its delimbing position between the branch removing member 21 and the platform 35.

In order to take advantage of the high delimbing capacity of the machine several log lifting units 39 may be provided. Said units may be moved and controlled automatically according to a predetermined program, comprising lifting the trunks to a suitable level, moving the trunks to a position above the delimbing position of the trunks in the machine, releasing the trunks to said delimbing position and returning to their starting position above the machine, from which position the lifting units may be moved by the operator for gripping the next tree trunk; et cetera. In order to avoid idle time, should two trunk gripping units arrive simultaneously at the trunk release position above the machine, one of the gripping units may lay off the trunk on supporting arms 53, swingably mounted on the frame of the machine, as shown in FIG. 12, hydraulic motors 54 or the like being provided for raising the arms 53 with their trunk load when the latter is to be fed to the delimbing position in the machine after the preceding trunk, or trunks, have been ejected and removed therefrom.

In FIGS. 9, 10 and 11 arms 41, extending upwards and outwards of the machine, are swingably mounted, at intervals, along the branch removing unit 21 and supported from the frame 32. Said arms 41 are provided for guiding the trunks to the delimbing position of the machine when the trunks are released by the trunk lifting units 39, and for holding the trunks in position during the delimbing operation. In the embodiment shown in FIG. 12 said arms 41 are replaced by a second branch removing member rotatably mounted higher up and outside of the primary branch removing member 21. The bearings of said second branch removing member may be supported and movable in a similar manner as described in connection with the trunk guiding arms 41. Generally, when using more than one branch removing member said members may be arranged in different manners with respect to the mutual distance between their shafts, the mutual vertical positions, the mutual movability of their shafts, their radii from the geometrical axis of their shafts to their branch removing edges et cetera.

In order to obtain maximum cutting function of the branch removing edges of the screw-shaped branch removing member the speed of rotation of the latter should not be too low. Experiments, carried out with a branch removing member having a length of 7000 mm. and a diameter of 600 mm., showed that the most suitable speed of rotation was approximately 750 r./min., though excellent results were obtained at speeds of rotation within the range 500–1000 r./min. In the example, mentioned above, the weight of the branch removing member was approximately 600 kilograms. Generally, weights between 300 and 900 kilograms, preferably between 450 and 750 kilograms, are suitable for the branch removing member, which in that case will possess a certain inertia in order to overcome, during the delimbing operation, the maximum loads occurring in connection with the cutting-off of thick branches. However, when the branch removing machine is to be used on a vehicle when harvesting trees in the forest it may, sometimes, be suitable to reduce the weight of the branch removing member as much as possible. Even with weights of the branch removing member of the order mentioned above the machine according to the invention is, however, more suitable for use in connection with mobile tree harvesting equipment than existing branch removing machines. This advantage makes the machine according to the invention suitable not only for clear cutting but also for the thinning of woods. The machine can be used in connection with various tree harvesting systems. In the following an example is given of a system, which is suitable for delimbing trunks in the forest.

The trees are felled manually by using chainsaws and are then cut in lengths suitable for pulpwood or saw log. The tractor-driven, or otherwise dirven, branch removing machine is then used for picking up the cut trunks one after the other and for delimbing them after which the delimbed trunks are left on the ground. The delimbed trunks are then collected and transported to a mill or some other place for further treatment. The collecting of the trunks may be carried out by means of the mobile branch removing equipment (or by means of special equipment) to bundles of 50, or more trunks, this method being particularly suitable in respect of pulpwood. For this purpose the mobile branch removing machine according to the invention may be provided with log collecting means at one or both sides thereof. The machine according to the invention can also be used as a stationary unit at a branch removing station. Thus, the use of the branch removing equiment according to the invention is very flexible.

FIG. 13 illustrates schematically a branch removing unit consisting of four branch removing screw-shaped members according to the invention. The number of such screws may also be 5, 6 or 8. The screws may be of short axial length and threaded only 360 degrees or less, if desired. The threads of one screw may extend radially between the threads of the adjacent screws. The logs are fed axially through the opening between the screws and one or more of them may be movable radially. This embodiment may be particularly suitable when a combined branch removing and bark removing operation is desired. In this case a rotor-type bark removing unit may be arranged behind, and coaxially with, the branch removing unit just described. Under certain circumstances the branch removing, screw-shaped or other, portions of the machine according to the invention may be provided with means for removing the bark from the logs.

Generally, in all embodiments of the branch removing means according to the invention, the depth A (FIG. 5) of the threaded branch removing portion should be ⅓ to ¼ of the outer diameter of the screw-shaped branch removing member and should amount to at least 50 mm., preferably at least 75 mm., and preferentially at least 150 mm. Experiments have shown that depths of the thread of the order of 150–300 mm., or more, yield excellent results. The depth of the threads corresponds to the radial distance between the sharp, branch removing edge portion, such as 4 or 14 in FIGS. 1–3, and the outer cylindrical surface, or the like, of the shaft, such as 3 in FIGS. 1–3, carrying the threaded branch removing portion (via the spacing member 12 in FIGS. 1–3).

When seen in a sectional plane, containing the geometrical axis of the rotatable branch removing member, the distance B (FIG. 5) between the screw-shaped branch removing portions, such as 4 in FIGS. 1–3, should be at least 100 mm., preferably at least 200 mm., and preferentially at least 300 mm., for instance 300–2000 mm. In the embodiments described above said distance is approximately 600 mm.

The invention is not limited to the embodiments as shown and described, because different modifications thereof may be made within the scope of the invention. Thus, for instance, the screw-shaped branch removing portion, instead of being in the shape of an outer thread, may have the shape of an inner thread, provided in a cylindircal drum, or cage construction, in which one, or preferably several tree trunks simultaneously, are treated for removing the branches thereof. In such a case the inner diameter of the drum, or cage construction, may preferably be many times larger than the diameter of the thickest log to be treated. Also, in this embodiment means should be provided for preventing axial movement of the logs during the delimbing operation. The drum or the like is rotatably mounted on a support in a manner similar to that used in connection with an ordinary barking drum and means, for instance, an underlying curved plate, may be provided for removing the cut off branches in a manner similar to the one previously described.

What we claim is:

1. A branch removing machine, comprising a frame and a branch removing member rotatably mounted on said frame and provided with branch removing portions, such as sharp edges, toothed edges or the like, in which said branch removing portions are arranged so as to remove the branches from a tree trunk by a cutting action directed obliquely with respect to the longitudinal direction of the tree trunk, said branch removing portions, when viewed in a sectional plane containing the axis of rotation of the branch removing member, being distributed along the branch removing member and having interspaces therebetween into which the branches can extend to a considerable depth before being cut off by said branch removing portions.

2. A machine as claimed in claim 1, characterized in that said branch removing portions in the shape of sharp or toothed edges, or the like, extend as one or more screw lines around the axis of rotation of the branch removing member.

3. A machine as claimed in claim 2, characterized in that said branch removing portions are arranged in one or more turns around the axis of rotation of the branch removing member.

4. A machine as claimed in claim 2, characterized in that the screw-shaped branch removing portion is threaded in one direction along a predetermined portion of the length of the branch removing member, preferably along half of said length, and threaded in the opposite direction along the remaining portion of the length of the branch removing member.

5. A machine as claimed in claim 2, characterized in that the screw-shaped branch removing portions are arranged in the form of an inner thread in a rotatable drum, or other rotatable supporting structure, in which one or, preferably, many tree trunks are treated simultaneously, the inner diameter of said drum, or the like, preferably being many times larger than the diameter of the thickest log to be treated.

6. A machine as claimed in claim 1, characterized in that said branch removing portions, in the shape of sharp or toothed edges, or the like, are directed substantially along the axis of rotation of the branch removing member when seen in a sectional plane containing said axis of rotation.

7. A machine as claimed in claim 1, characterized in that the radial depth of said interspaces between the branch removing portions, into which the branches can extend before being cut off, is at least 50 mm., preferably at least 75 mm., and preferentially at least 150 mm., measured from a plane extending tangentially of the rotatable branch removing member and containing said branch removing portions.

8. A machine as claimed in claim 1, characterized in that the breadth of said interspaces between the branch removing portions, into which the branches can extend before being cut off, is at least 100 mm., preferably at least 200 mm. and preferentially at least 300 mm., measured in the direction of the axis of rotation of the branch removing member.

9. A machine as claimed in claim 8, characterized in that the breadth of said interspaces corresponds to approximately 0.5–2 times the outer diameter of the branch removing member, said diameter amounting to 0.3–1.2 m., preferably 0.4–0.9 m., and preferentially 0.5–0.6 m.

10. A machine as claimed in claim 1, characterized in that the branch removing member is provided with curved or flat portions abutting against the tree trunk during the branch removing operation.

11. A machine as claimed in claim 1, characterized in that a pair of branch removing members are arranged in parallel with and near each other in such a manner that a V-shaped working zone is formed therebetween.

12. A machine as claimed in claim 1, characterized in that a conveyor, or the like, for the tree trunks is arranged to hold the trunks in engagement with the branch removing member, to feed said trunks to and to move them away from the branch removing member.

13. A machine as claimed in claim 1, characterized by a curved plate or the like mounted beneath and near the branch removing member and extending in the direction of the axis of rotation of the branch removing member.

14. A machine as claimed in claim 1, characterized in that plates or the like are provided in the interspaces between the branch removing portions along at least part of the length of the branch removing member, said plates or the like being arranged to throw away the cut-off branches.

References Cited
UNITED STATES PATENTS 2,583,971  1/1952  Shuff.
2,948,311  8/1960  McCollum.

WILLIAM W. DYER, Jr., *Primary Examiner.*

W. D. BRAY, *Assistant Examiner.*